US 9,848,748 B2

(12) United States Patent
Stickney et al.

(10) Patent No.: US 9,848,748 B2
(45) Date of Patent: Dec. 26, 2017

(54) CYCLONIC SEPARATING APPARATUS (71) Applicant: Dyson Technology Limited, Wiltshire (GB)

(72) Inventors: Timothy Nicholas Stickney, Gloucester (GB); Michael Edward Lambourn, Oxford (GB)

(73) Assignee: DYSON TECHNOLOGY LIMITED, Malmesbury, Wiltshire (GB)

( * ) Notice: Subject to any disclaimer, the term of this patent is extended or adjusted under 35 U.S.C. 154(b) by 8 days.

(21) Appl. No.: 14/367,039

(22) PCT Filed: Dec. 5, 2012

(86) PCT No.: PCT/GB2012/053006
§ 371 (c)(1),
(2) Date: Jun. 19, 2014

(87) PCT Pub. No.: WO2013/093415
PCT Pub. Date: Jun. 27, 2013

(65) Prior Publication Data
US 2014/0366495 A1 Dec. 18, 2014

(30) Foreign Application Priority Data

Dec. 22, 2011 (GB) .................................. 1122161.1

(51) Int. Cl.
*B01D 45/00* (2006.01)
*A47L 9/16* (2006.01)
(Continued)

(52) U.S. Cl.
CPC ............. *A47L 9/1641* (2013.01); *A47L 9/127* (2013.01); *A47L 9/1608* (2013.01);
(Continued)

(58) Field of Classification Search
CPC .... A47L 9/1641; A47L 9/1633; A47L 9/1666; A47L 9/1658; A47L 9/127; A47L 9/1608; A47L 9/1683; A47L 9/1625; B01D 45/16
(Continued)

(56) References Cited

U.S. PATENT DOCUMENTS 3,425,192 A 2/1969 Davis
4,373,228 A 2/1983 Dyson
(Continued)

FOREIGN PATENT DOCUMENTS

EP 1 268 076 1/2003
EP 1 938 733 7/2008
(Continued)

OTHER PUBLICATIONS

International Search Report and Written Opinion dated Aug. 6, 2013 directed to PCT/GB2012/053006; 16 pages.
(Continued)

*Primary Examiner* — Dung H Bui
(74) *Attorney, Agent, or Firm* — Morrison & Foerster LLP (57) ABSTRACT A cyclonic separating apparatus comprising a first cyclonic separating unit and, downstream from the first cyclonic separating unit, a second cyclonic separating unit comprising a plurality of cyclones arranged fluidly in parallel about a first axis and a dust collector arranged to receive dust from each of the plurality of cyclones. Each of the plurality of cyclones in the second cyclonic separation unit comprise a fluid inlet and a fluid outlet, the plurality of cyclones being divided into at least a first set of cyclones and a second set of cyclones, the fluid inlets of the first set of cyclones arranged in a first group and the fluid inlets of the second set of cyclones arranged in a second group spaced along said axis from the first group. Each outlet of the plurality of
(Continued)

cyclones in the second cyclonic separation unit is provided by a common plate-like vortex finder member.

12 Claims, 8 Drawing Sheets

(51) Int. Cl.
*B01D 45/16* (2006.01)
*A47L 9/12* (2006.01)

(52) U.S. Cl.
CPC ........... *A47L 9/1625* (2013.01); *A47L 9/1633* (2013.01); *A47L 9/1658* (2013.01); *A47L 9/1666* (2013.01); *A47L 9/1683* (2013.01); *B01D 45/16* (2013.01)

(58) Field of Classification Search
USPC ............ 55/343, 345, 346, 349, 428, DIG. 3; 95/271; 15/353, 350
See application file for complete search history.

(56) References Cited

U.S. PATENT DOCUMENTS

| | | | |
|---|---|---|---|
| 4,863,500 A * | 9/1989 | Rombout | B01D 45/12 209/712 |
| 6,607,572 B2 | 8/2003 | Gammack et al. | |
| 7,655,058 B2 * | 2/2010 | Smith | A47L 9/165 15/353 |
| 7,744,667 B2 * | 6/2010 | Oh | A47L 9/1625 55/343 |
| 7,803,205 B2 * | 9/2010 | Oh | A47L 9/122 55/337 |
| 7,828,866 B2 * | 11/2010 | Courtney | A47L 9/1625 55/343 |
| 7,867,306 B2 * | 1/2011 | Courtney | A47L 9/1625 55/343 |
| 7,874,040 B2 * | 1/2011 | Follows | A47L 9/1616 15/347 |
| 8,438,700 B2 * | 5/2013 | Makarov | A47L 9/1625 15/347 |
| 2008/0172994 A1 * | 7/2008 | Courtney | A47L 9/1625 55/345 |
| 2009/0100810 A1 * | 4/2009 | Smith | A47L 9/1625 55/343 |
| 2010/0218338 A1 * | 9/2010 | McLeod | A47L 9/1625 15/347 |
| 2010/0242216 A1 * | 9/2010 | MacNaughton | A47L 5/362 15/347 |
| 2010/0242221 A1 * | 9/2010 | Horne | A47L 9/127 15/347 |
| 2015/0320271 A1 * | 11/2015 | Dimbylow | A47L 5/365 15/353 |

FOREIGN PATENT DOCUMENTS

| | | |
|---|---|---|
| GB | 2468150 | 9/2010 |
| GB | 2475313 | 5/2011 |
| GB | 2478155 | 8/2011 |
| WO | WO-2010/097612 | 9/2010 |

OTHER PUBLICATIONS

Search Report dated Mar. 29, 2012, directed to GB Application No. 1122161.1; 1 page.

* cited by examiner

CYCLONIC SEPARATING APPARATUS

REFERENCE TO RELATED APPLICATIONS

This application is a national stage application under 35 USC 371 of International Application No. PCT/GB2012/053006, filed Dec. 5, 2012, which claims the priority of United Kingdom Application No. 1122161.1, filed Dec. 22, 2011, the entire contents of which are incorporated herein by reference.

FIELD OF THE INVENTION

The present invention relates to a cyclonic separating apparatus, and more particularly to a vacuum cleaner equipped with such a cyclonic separating apparatus. In a preferred embodiment, the cyclonic separating apparatus is used in a handheld vacuum cleaner. The invention also relates to a vortex finder plate used in such an apparatus.

BACKGROUND OF THE INVENTION

Vacuum cleaners which use cyclonic separating apparatus are well known. Examples of such vacuum cleaners are shown in U.S. Pat. No. 4,373,228, U.S. Pat. No. 3,425,192, U.S. Pat. No. 6,607,572 and EP1268076. The separating apparatus comprises first and second cyclonic separating units through which incoming air passes sequentially. This allows the larger dirt and debris to be extracted from the airflow in the first separating unit, enabling the second cyclone to operate under optimum conditions and so effectively to remove very fine particles in an efficient manner.

In some cases, the second cyclonic separating unit includes a plurality of cyclones arranged fluidically in parallel. These cyclones are usually arranged in a ring extending about the longitudinal axis of the separating apparatus. Through providing a plurality of relatively small cyclones in parallel instead of a single, relatively large cyclone, the separation efficiency of the separating unit, that is, the ability of the separating unit to separate entrained particles from an air flow, can be increased. This is due to an increase in the centrifugal forces generated within the cyclones which cause dust particles to be thrown from the air flow.

Increasing the number of parallel cyclones can further increase the separation efficiency, or pressure efficiency, of the separating unit for the same overall pressure resistance. However, when the cyclones are arranged in a ring this can increase the external diameter of the separating unit, which in turn can undesirably increase the size of the separating apparatus. One proposal to increase the number of cyclones without correspondingly increasing the overall size of the separating unit is to arrange the cyclones into groups or banks of cyclones, one group being 'stacked' above the other group. Whilst this cyclone configuration benefits the size of the separating unit, it makes sealing the outlets of the cyclones challenging.

SUMMARY OF THE INVENTION

Against this background, the invention resides in a cyclonic separating apparatus, for a surface treating appliance, comprising a first cyclonic separating unit and, downstream from the first cyclonic separating unit, a second cyclonic separating unit comprising a plurality of cyclones arranged fluidly in parallel about a first axis and a dust collector arranged to receive dust from each of the plurality of cyclones. Each of the plurality of cyclones in the second cyclonic separation unit comprises a fluid inlet and a fluid outlet, the plurality of cyclones being divided into at least a first set of cyclones and a second set of cyclones, the fluid inlets of the first set of cyclones being arranged in a first group and the fluid inlets of the second set of cyclones being arranged in a second group spaced along said axis from the first group, wherein each outlet of the plurality of cyclones in the second cyclonic separation unit is provided by a common vortex finder member.

Beneficially, the invention enables all of the cyclones in both the first and second sets to have air outlets provided by a single, unitary vortex finder member, or 'plate'. Such an arrangement improves the sealing of the cyclone outlets since a single vortex finder plate can be assembled on both upper and lower banks of the cyclones which reduces the risk of air leaks which may occur if the vortex finder were provided by two or more structures. This is a significant challenge, particularly in cyclone arrangement in which first and second sets of cyclones are spaced from one another along a shared central axis.

The fluid inlets of the first and second set of cyclones may be arranged in respective annular configurations, and the second annular arrangement of inlets may have a smaller diameter than the first annular arrangement of inlets. Although the second set of cyclones may be spaced from the first set so as to be physically separated from it, in order to reduce the overall size of the separating unit, the second set of cyclones may be at least partially received or 'nested' inside the first set of cyclones.

In order to enable further size reduction of the separating unit, the cyclones of the second set of cyclones may be arranged so that they are positioned between a respective pair of cyclones in the first set. Furthermore, the air inlets of said cyclones may be arranged to face one another so as to be fed air from a common airflow channel or conduit. This allows at least three cyclones, two from the first set, or bank, and one from the second set, or bank, to be positioned closer together.

To benefit the flow of air through the air inlets of the secondary cyclones, the air inlets may be formed as fully enclosed ducts in cross section as opposed to open troughs or channels. In this way, the gaskets that serve to seal the upper ends of the secondary cyclones during the assembly procedure are able to bear against a solid upper surface of the duct and are not forced into the interior of the duct. This also improves the consistency of the airflow between the air inlets of different ones of the secondary cyclones.

The vortex finder member may take the form of a plate or dish which is connectable to the upper ends of the first and second set of cyclones and is provided with vortex finders, each of which extends into a respective one of the cyclones. In one embodiment, the vortex finder member comprises first and second annular portions that are arranged concentrically and spaced apart along the first axis and connected by a wall portion. Further, each of the first and second annular portions may include a plurality of segments each of which defines a single vortex finder.

In order to channel the air flowing out of the cyclones, an exhaust manifold may be provided above the vortex finder member such that is sandwiched between the plurality of cyclones and the exhaust manifold. In addition, one or more sealing gaskets may be provided to form a reliable seal between the vortex finder plate and each of the first and second sets of cyclones.

The exhaust manifold serves to channel the air from the vortex finders into an air duct located along the first axis of the separating apparatus about which the plurality of cyclones are arranged. The air duct may receive a sock filter for filtering fine contaminants from the air that have not been separated by the cyclones. In a preferred arrangement, the filter includes a generally cylindrical filter media portion adjacent a filter mounting portion, wherein the filter mounting portion is engageable with a centrally located aperture in the exhaust manifold so that filter extends into the air duct.

The mounting portion may define an air inlet of the sock filter, and preferably comprises a plurality of apertures or windows around the exterior surface of the mounting portion so that air can flow radially into the interior of the filter. Beneficially, this configuration enables the height of the filter to be reduced since the air can flow into the filter radially rather than axially. Such a height reduction is advantageous in the context of a handheld vacuum cleaner.

The invention can also be expressed as a vortex finder plate for use in a cyclonic separating apparatus, the vortex finder plate comprising a first annular portion extending about a major axis and from which a plurality of vortex finders depend, a second annular portion extending about the major axis and from which a plurality of vortex finders depend, the first annular portion and the second annular portion being spaced along the major axis and being connected by a connecting portion.

The first and second annular portions are therefore staggered or stepped along the major axis of the finder plate, the connecting portion connecting the first and second annular portions preferably being a continuous wall which extends from an inner periphery of the first annular portion to an outer periphery of the second annular portion.

Each of the first and second annular portions may include a plurality of segments, being substantially planar, from which a respective one of the vortex finders depend. Each segment is shaped to define a part circular outer edge so as to match with an associated cyclone. The outer edge of a respective segment will therefore lie flush with an adjacent cyclone. Although the annular portions may be entirely rigid, in one embodiment, each planar segment may be demarcated from its neighbouring segment by a line of weakness that permits a degree of flexibility between adjacent segments. Such an arrangement therefore enables a degree of play to the segments which improves the ability of the segments to seal against their associated cyclones when the vortex plate is assembled onto the first and second sets of cyclones.

In order for a filter to be received through the vortex finder plate, the upper, annular portion may define a central aperture adapted for engagement with a filter member. Conversely, the second annular portion surround the first annular portion and may be dished, or angled, downwardly towards its outer periphery with respect to the first annular portion.

From another aspect, the invention provides a separating apparatus of the cyclonic type including a first cyclonic separating unit and a second cyclonic separating unit downstream from the first cyclonic separating unit. The second cyclonic separating unit includes a plurality of cyclones arranged fluidly in parallel. Each of the plurality of cyclones in the second cyclonic separating unit includes a first end having a fluid inlet and a fluid outlet, and a second end having a dirt discharge outlet. A sealing member is mounted to the first end of the plurality of cyclones in the second cyclonic separating unit in order to prevent fluid escaping therefrom. The fluid inlet of each of the cyclones in the second cyclonic separating unit has a fully enclosed cross section, for example circular or rectangular thereby preventing material ingress to the fluid inlet. This improves consistency of fluid flow rate between each inlet of the plurality of inlets.

BRIEF DESCRIPTION OF THE DRAWINGS

Embodiments of the present invention will now be described, by way of example only, with reference to the accompanying drawings, in which.

DETAILED DESCRIPTION OF THE INVENTION

Figure 1:
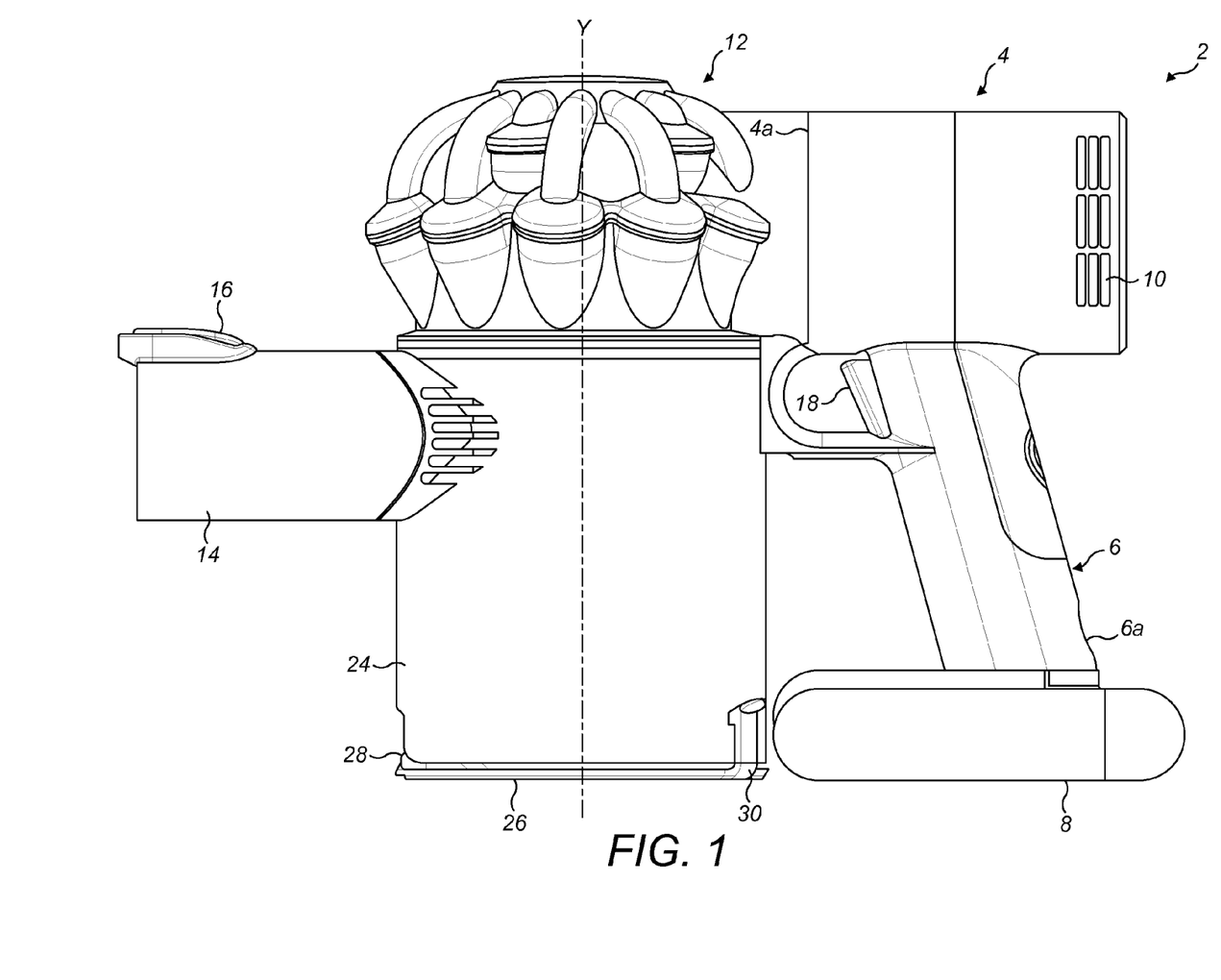
FIG. 1 is a side view of a handheld vacuum cleaner in accordance with the invention.
Figure 2:
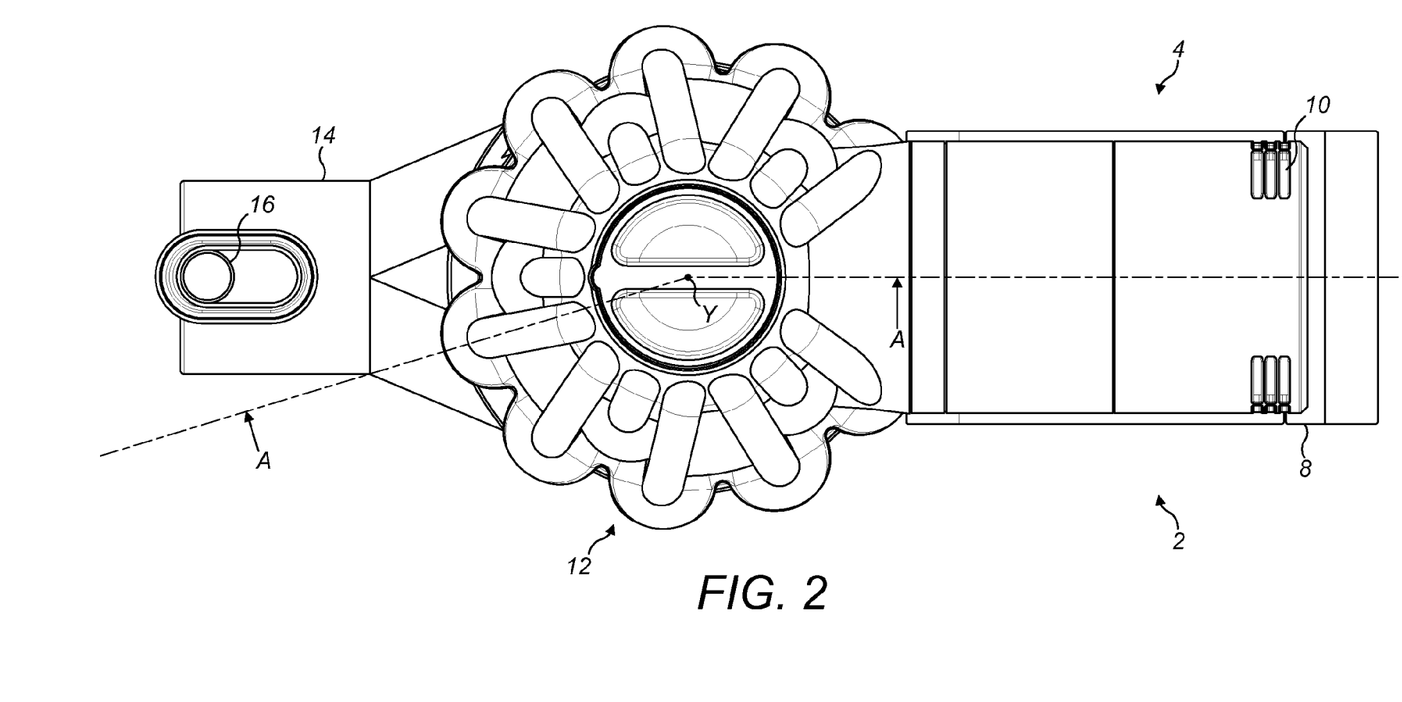
FIG. 2 is a view from above of the vacuum cleaner of FIG. 1.

Referring firstly to FIGS. 1 and 2, a handheld vacuum cleaner 2 has a main body 4 which houses a motor and fan unit (not shown) above a generally upright handle or grip portion 6. The lower end 6a of the handle 6 supports a generally slab-like battery pack 8. A set of exhaust vents 10 are provided on the main body 4 for exhausting air from the handheld vacuum cleaner 2.

The main body 4 supports a cyclonic separating apparatus 12 that functions to remove dirt, dust and other debris from a dirt-bearing airflow drawn into the vacuum cleaner by the motor and fan unit. The cyclonic separator 12 is attached to a forward part 4a of the main body 4 and an air inlet nozzle 14 extends from a forward portion of the cyclonic separator that is remote from the main body 4. The air inlet nozzle 14 is configured so that a suitable brush tool can be removably mounted to it and includes a catch 16 for securely holding such a brush tool when the tool is engaged with the inlet. The brush tool is not material to the present invention and so is not shown here.

The cyclonic separating apparatus 12 is located between the main body 4 and the air inlet nozzle 14 and so also between the handle 6 and the air inlet nozzle 14. The separating apparatus 12 has a longitudinal axis Y which extends in a generally upright direction so that the handle 6 lies at a shallow angle to the axis Y.

The handle 6 is oriented in a pistol-grip formation which is a comfortable interface for a user since it reduces stress on a user's wrist during cleaning. The separating apparatus 12 is positioned close to the handle 6 which also reduces the moment applied to the user's wrist when the handheld vacuum cleaner 2 is in use. The handle 6 carries an on/off switch in the form of a trigger 18 for turning the vacuum cleaner motor on and off. In use, the motor and fan unit draws dust laden air into the vacuum cleaner 12 via the air inlet nozzle 14. Dirt and dust particles entrained within the air flow are separated from the air and retained in the separating apparatus 12. The cleaned air is ejected from the rear of the separating apparatus 12 and conveyed by a short duct to the motor and fan unit located within the main body 4, and is subsequently expelled through the air outlets 10.

Figure 3:
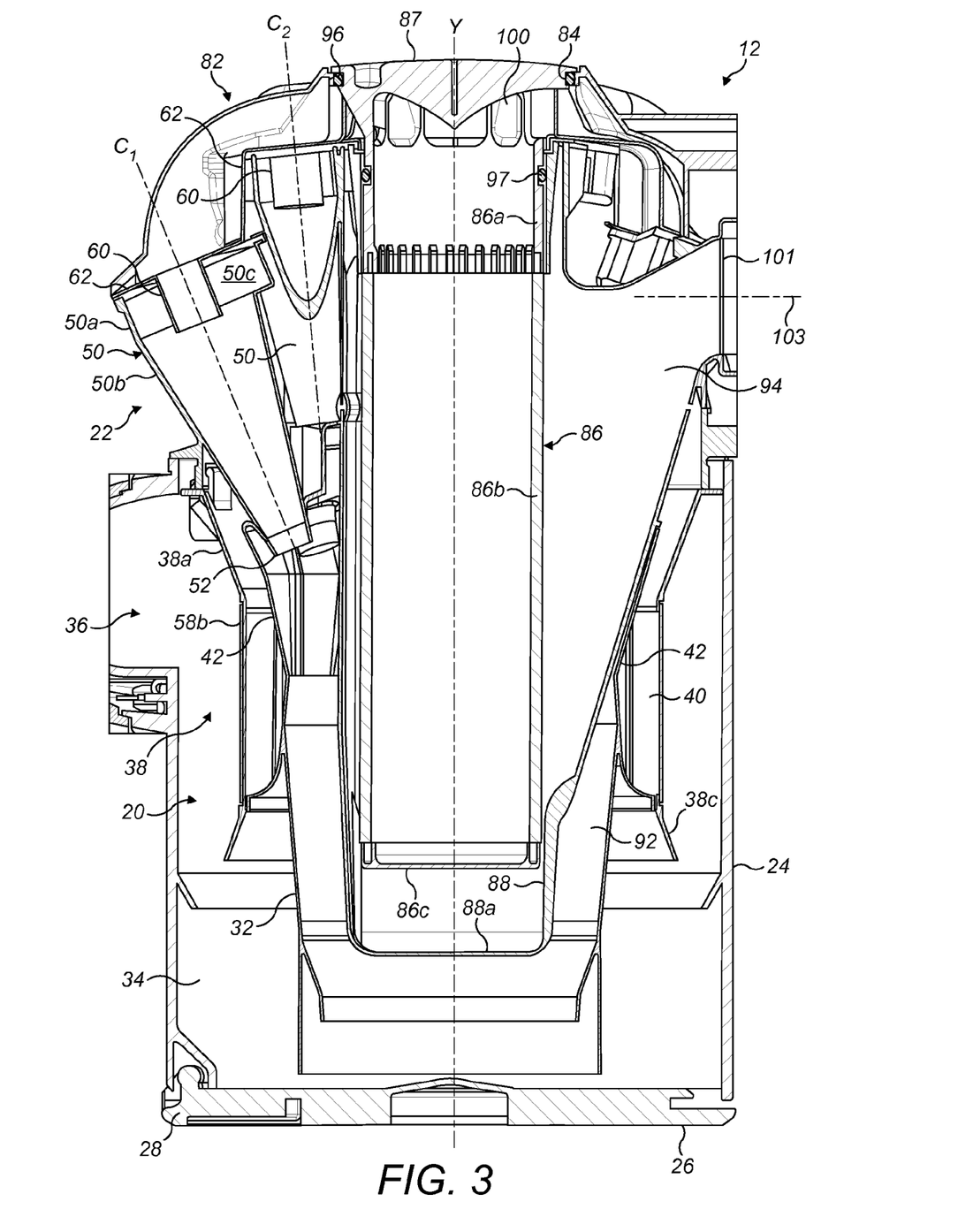
FIG. 3 is a vertical section through the separating apparatus along line A-A in FIG. 2.
Figure 4:
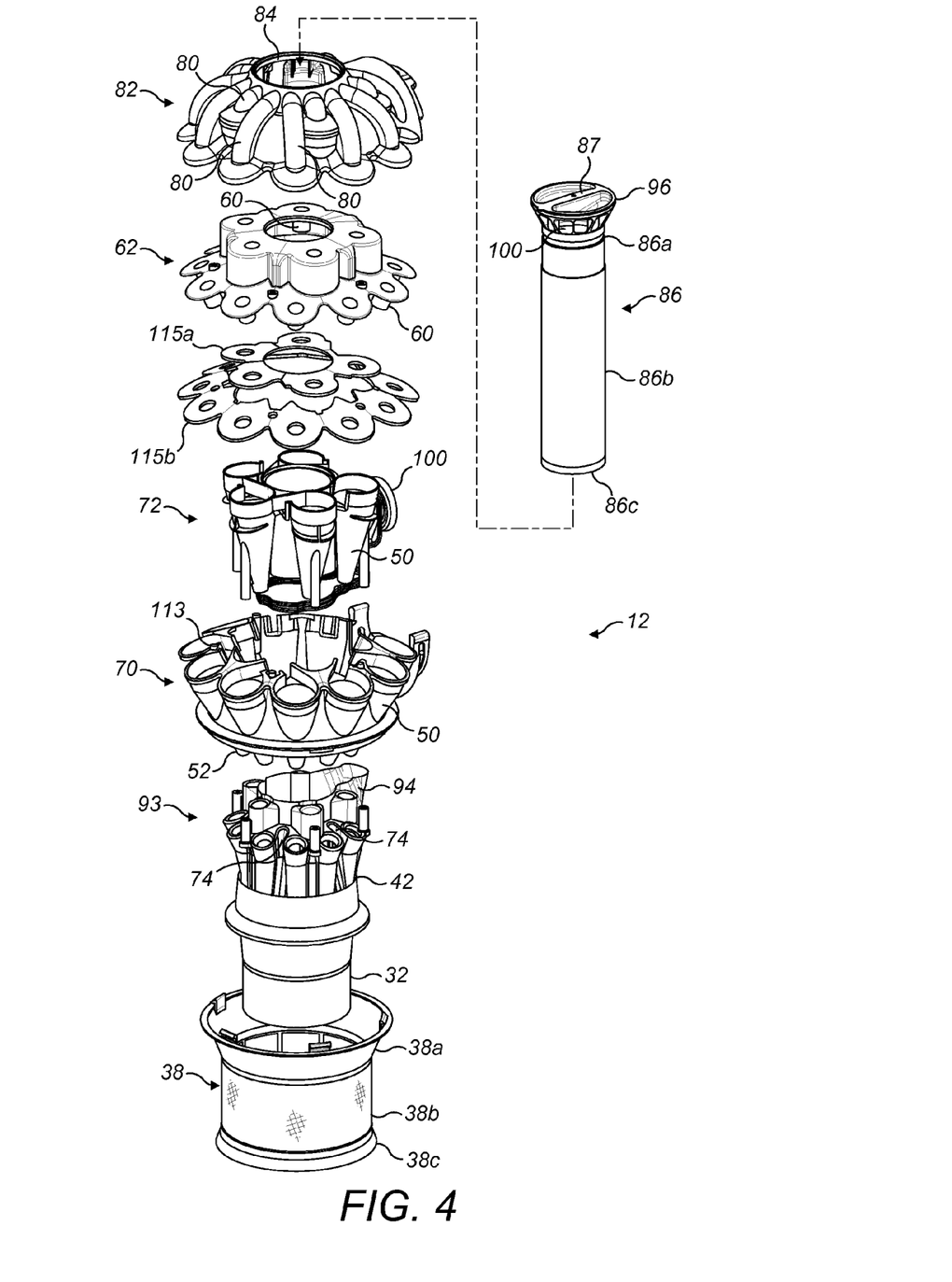
FIG. 4 is an exploded perspective view of the separating apparatus of the vacuum cleaner in FIGS. 1 and 2.

The separating apparatus 12 forming part of the handheld vacuum cleaner 2 is shown in more detail in FIG. 3 which is a cross section through the separating apparatus 12 along the line A-A in FIG. 2, and FIG. 4 which shows an exploded view of the components of the separating apparatus 12. In overview, the separating apparatus 12 comprises a first cyclonic separating unit 20 and a second cyclonic separating unit 22 located downstream from the first cyclonic separating unit 20. In this example, the first cyclonic separating unit 20 extends about part of the second cyclonic separating unit 22.

It should be appreciated that the specific overall shape of the separating apparatus can be varied according to the type of vacuum cleaner in which the separating apparatus is to be used. For example, the overall length of the separating apparatus can be increased or decreased with respect to the diameter of the separating apparatus 12.

The separating apparatus 12 comprises an outer bin 24 defined by an outer wall being substantially cylindrical in shape and which extends about a longitudinal axis Y of the separating apparatus 12. The outer bin 24 is preferably transparent so that components of the separating apparatus 12 are visible through it.

The lower end of the outer bin 24 is closed by a bin base 26 that is pivotably attached to the outer wall 24 by means of a pivot 28 and held in a closed position by a catch 30. Radially inward of and coaxial with the outer wall 24 is a second cylindrical wall 32 so that an annular chamber 34 is defined between the two walls. The second cylindrical wall 32 engages and is sealed against the base 26 when it is closed. The upper portion of the annular chamber 34 forms a cylindrical cyclone of the first cyclonic separating unit 20 and the lower portion of the annular chamber forms a dust collecting bin of the first cyclonic separating unit 20.

A bin inlet 36 is provided at the upper end of the chamber 34 for receiving an air flow from the air inlet nozzle 14. Although not shown in the Figures, the bin inlet 36 is arranged tangentially to the chamber 34 so as to ensure that incoming dirty air is forced to follow a helical path around the chamber 34.

A fluid outlet is provided in the outer bin in the form of a generally cylindrical shroud 38. More specifically, the shroud has an upper frusto-conical wall 38a that tapers towards a lower cylindrical wall 38b that depends downwardly into the chamber 34. A skirt 38c depends from the lower part of the cylindrical wall and tapers outwardly in a direction towards the outer wall 24. The lower wall 38c of the shroud is perforated therefore providing the only fluid outlet from the chamber 34.

A second annular chamber 40 is located behind the shroud 38 and provides a manifold from which airflow passing through the shroud 38 from the first separating unit 20 is fed to the second cyclonic separating unit 22 through a plurality of conduits or channels 74 defined by a centrally positioned cyclone support structure 42. The second cyclonic separating unit 22 comprises a plurality of cyclones 50 arranged fluidically in parallel to receive air from the first cyclonic separating unit 20. In this example, the cyclones 50 are substantially identical in size and shape, each comprising a cylindrical portion 50a and a tapering portion 50b depending downwardly therefrom (only one cyclone is labelled in FIG. 3 for clarity). The cylindrical portion 50a comprises an air inlet 50c for receiving fluid from one of the channels 74. The tapering portion 50b of each cyclone is frusto-conical in shape and terminates in a cone opening 52 at its bottom end through which dust is ejected, in use, into the interior of the cyclone support structure 42. An air outlet in the form of a vortex finder 60 is provided at the upper end of each cyclone 50 to allow air to exit the cyclone. Each vortex finder 60 extends downwardly from a vortex finder member 62 as will be explained.

As is shown clearly in FIGS. 3 and 4, the cyclones of the second cyclonic separating unit 22 are grouped into a first set of cyclones 70 and a second set of cyclones 72. Although not essential to the invention, in this embodiment the first set of cyclones 70 contains more cyclones (ten in total) than the second set of cyclones 72 (five in total).

Each set of cyclones 70, 72 is arranged in a ring which is centered on a longitudinal axis Y of the separating unit. The first set of cyclones 70 has a greater number so this forms a relatively large ring of cyclones into which the second set of cyclones is partially received or 'nested'. Note that FIG. 4 depicts the first and second set of cyclones in an exploded view for clarity, whilst FIG. 3 shows the relative positioning of the first and second sets of cyclones when in a nested, but axially spaced, position so that the second set of cyclones can be considered to be 'stacked' on the first set of cyclones.

Each cyclone 50 of both sets has a longitudinal axis C which is inclined downwardly and towards the longitudinal axis Y of the outer wall 52. However, to enable a greater degree of nesting of the second set of cyclones into the first set of cyclones, the longitudinal axes $C_2$ of the second set of cyclones 72 are all inclined at to the longitudinal axis Y of the outer wall at a shallower angle than the longitudinal axes $C_1$ of the first set of cyclones 70.

Figure 5:
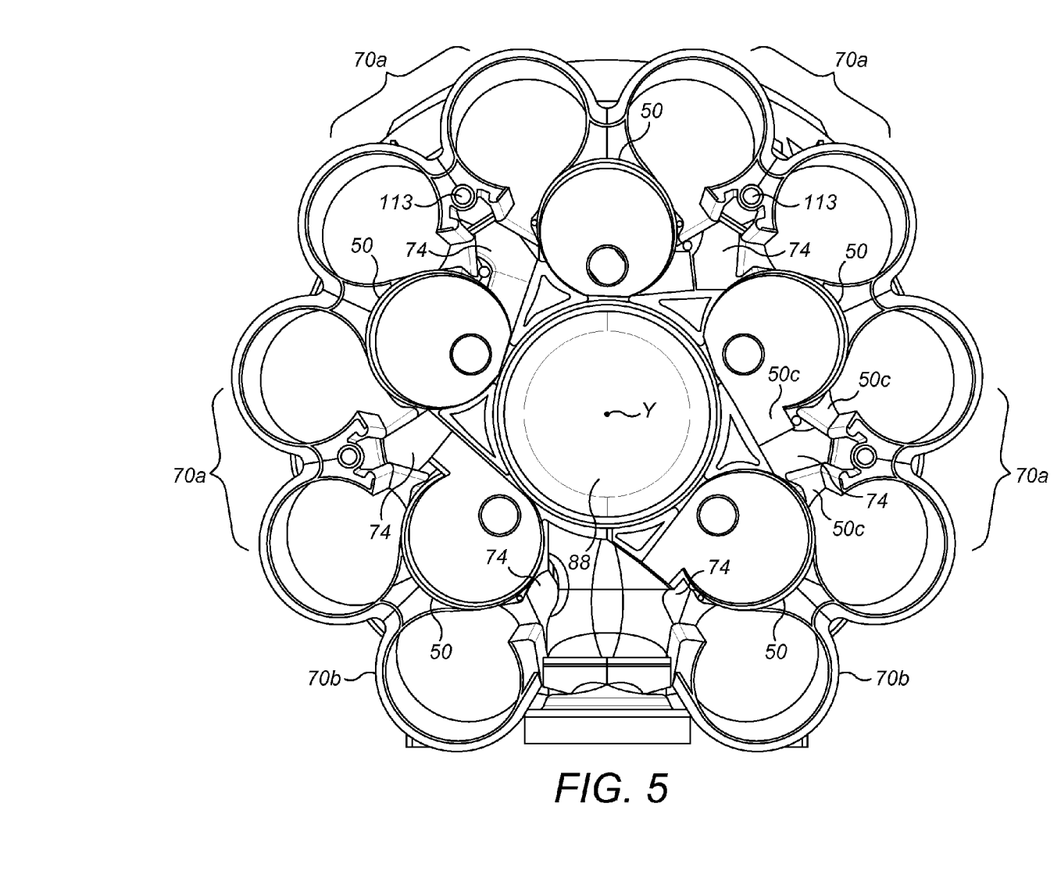
FIG. 5 is a view looking down into the cyclones of the separating apparatus.

Referring now to FIG. 5, and specifically the outer ring defined by the first set of cyclones 70, it can be seen that the cyclones are arranged into subsets 70a which each comprise at least two cyclones. In this example, each subset of cyclones comprises an adjacent pair of cyclones so that the first set of cyclones 70 is divided into five subsets of cyclones 70a, one subset of which 70b are spaced apart more than the others. Within each subset, the cyclones 70a are arranged so that the air inlets 50c are located opposite to each other. The cyclone subset 70b located that the rear of the separating apparatus 12 are spaced apart to allow the passage of an exhaust duct 94, as will be explained.

In this example, each subset of cyclones 70a, 70b is arranged to receive air from a respective one of the plurality of channels 74 defined by the cyclone support structure 42 which channel airflow from the annular chamber 40 located behind the shroud 38 to the air inlets 50c of respective cyclones.

It will also be noted from FIG. 5 that the cyclones 50 in the second set of cyclones 72 are arranged also in a ring-like pattern and distributed annularly such that each cyclone is positioned between an adjacent pair of cyclones in the first set of cyclones 70. Furthermore, the respective inlets 50c of the second set of cyclones are oriented to face a respective one of the channels 74 that feed air also to the first set of cyclones 70. Since the air inlets 50c of both the first and second sets of cyclones are fed air from a channel 74 that leads from the same annular chamber 40, the first and second sets of cyclones can be considered to be fluidly in parallel.

Turning once again to FIGS. 3 and 4, the vortex finders 60 are defined by a short cylindrical tube that extends downwardly into an upper region of a respective cyclone 50. Each vortex finder 60 leads into a respective one of a plurality of radially distributed air channels or 'vortex fingers' 80 defined by an exhaust plenum or manifold 82 located at the top of the separating apparatus 12 that serves to direct air from the outlets of the cyclones to a central aperture 84 of the manifold 82. The aperture 84 constitutes the upper opening of a central duct 88 of the separating apparatus into which a filter member 86 is received. In this embodiment, the filter member 86 is an elongate tubular filter or 'sock filter' that extends down into the central duct 88 along the axis Y, and is delimited by a third cylindrical wall 90 defined by the cyclone supporting structure 42.

The third cylindrical wall 90 is located radially inwardly of the second cylindrical wall 32 and is spaced from it so as to define a third annular chamber 92. An upper region of the cyclone support structure 42 provides a cyclone mounting arrangement 93 to which the cone openings 52 of the cyclones of the second cyclonic separating 22 are mounted so that they communicate with the interior of the support structure 42. In this way, in use, dust separated by the cyclones 50 of the second cyclonic separating unit 22 is ejected through the cone openings 52 and collects in the third annular chamber 92. The chamber 92 therefore forms a dust collecting bin of the second cyclonic separating unit 22 that can be emptied simultaneously with the dust collecting bin of the first cyclonic separating unit 20 when the base 26 is moved to an open position.

During use of the vacuum cleaner, dust laden air enters the separating apparatus 12 via the bin inlet 36. Due to the tangential arrangement of the bin inlet 36, the dust laden air follows a helical path around the outer wall 24. Larger dirt and dust particles are deposited by cyclonic action in the first annular chamber 34 and collect at the bottom of the chamber 34 in the dust collecting bin. The partially-cleaned dust laden air exits the first annular chamber 34 via the perforated shroud 38 and enters the second annular chamber 40. The partially-cleaned air then passes into the air channels 74 of the cyclone support structure 42 and is conveyed to the air inlets 50c of the first and second sets of cyclones 70, 72. Cyclonic separation is set up inside the two sets of cyclones 70, 72 in order to separate the relatively fine dust particles still entrained within the airflow.

The dust particles separated from the airflow by the first and second set of cyclones 70, 72 are deposited in the third annular chamber 92, also known as a fine dust collector. The further cleaned air then exits the cyclones via the vortex finders 60 and passes into the manifold 82, from which the air enters the sock filter 86 in the central duct 88 and from there passes into the exhaust duct 94 of the cyclone separator whereby the cleaned air is able to exit the separating apparatus.

As can be seen in FIGS. 3 and 4, the filter 86 comprises an upper mounting portion 86a and lower filter portion 86b that carries out the filtering function and so is formed from a suitable mesh, foam or fibrous filter media. The upper mounting portion 86a supports the filter portion 86b and also serves to mount the filter 86 within the duct 88 by engaging with the aperture 84 of the exhaust manifold 82. The mounting portion 86a defines a circular outer rim that carries a sealing member 96, for example in the form of an o-ring, by which means the mounting portion is received removably, but securely, within the aperture 84 of the manifold, simply by way of a press fitting. Since the mounting portion 86a is circular, there is no restriction on the angular orientation of the filter, which aids a user in relocating the filter. Although not shown here, it should be appreciated that the filter 86 could also be provided with a locking mechanism if it is desired to more securely hold the filter in position. For example, the filter mounting portion 86a could carry a twist-lock fitting formation so that the filter could be twisted in a first direction to lock it into position within the aperture 84, and twisted in the opposite direction to unlock the filter.

The mounting portion 86a also includes an annular upper section provided with apertures or windows 100 distributed around its circumference, the apertures 100 providing an airflow path for air to enter the interior of the filter member 86. The sealing member 96 prevents airflow from entering into the region of the filter from outside of the separating apparatus. Beneficially, the apertures 100 are distributed angularly around the periphery of the mounting portion 86a and are arranged so as to be in line with a respect one of the radially distributed vortex fingers 80 of the manifold 82 which means that air can flow substantially uninterrupted from the ends of the vortex fingers 80 into a neighbouring one of the inlet apertures 100 of the filter 86. Air therefore flows into the filter 86 in a radial direction through the apertures 100, following which the air flows down the interior of the filter 86 and then exits through the cylindrical filter media in a radial direction. A second sealing element 97, also in the form of an o-ring, is located in an annular groove on the exterior of the mounting portion 86a thus extending circumferentially about the mounting portion thereby preventing air from flowing down the side of the filter from the inlet section.

After flowing out of the filter 86, the cleaned air then travels up the outlet passage 94 and exhausts the separating apparatus 12 via an exit port 101 located at the rear of the separating unit. It should be noted that the outlet passage 94 is shaped so as have a generally inclined orientation relative to the central axis Y of the duct 88 and rises to a position so that it lies between the two rearmost cyclones on the first set of cyclones 70. The exit port 101 of the outlet passage 94 is oriented generally horizontally and rearwardly from the separating apparatus 12 and is aligned on an axis 103 that is substantially orthogonal to the longitudinal axis Y of the separating apparatus 12.

This configuration of airflow inlet enables the housing of the filter to be more compact since the alternative of allowing air to flow into the filter 86 in an axial direction requires a chamber above the inlet end of the filter to direct air into the top of the filter. The filter of the invention therefore avoids the need for such a chamber which enables the filter housing to be reduced in height.

Having described the general function of the separating apparatus 12, the skilled reader will appreciate it includes two distinct stages of cyclonic separation. First, the first cyclonic separating unit 12 comprises a single cylindrical cyclone 20 having a relatively large diameter to cause comparatively large particles of dirt and debris to be separated from the air by virtue of the relatively small centrifugal forces. A large proportion of the larger debris will reliably be deposited in the dust collecting bin 34.

Second, the second cyclonic separating unit 22 comprises fifteen cyclones 50, each of which has a significantly smaller diameter than the cylindrical first cyclone unit 20 and so is capable of separating finer dirt and dust particles due to the increased speed of the airflow therein. The separation efficiency of the cyclones is therefore considerably higher than that of the cylindrical first cyclone unit 20.

Figure 6:
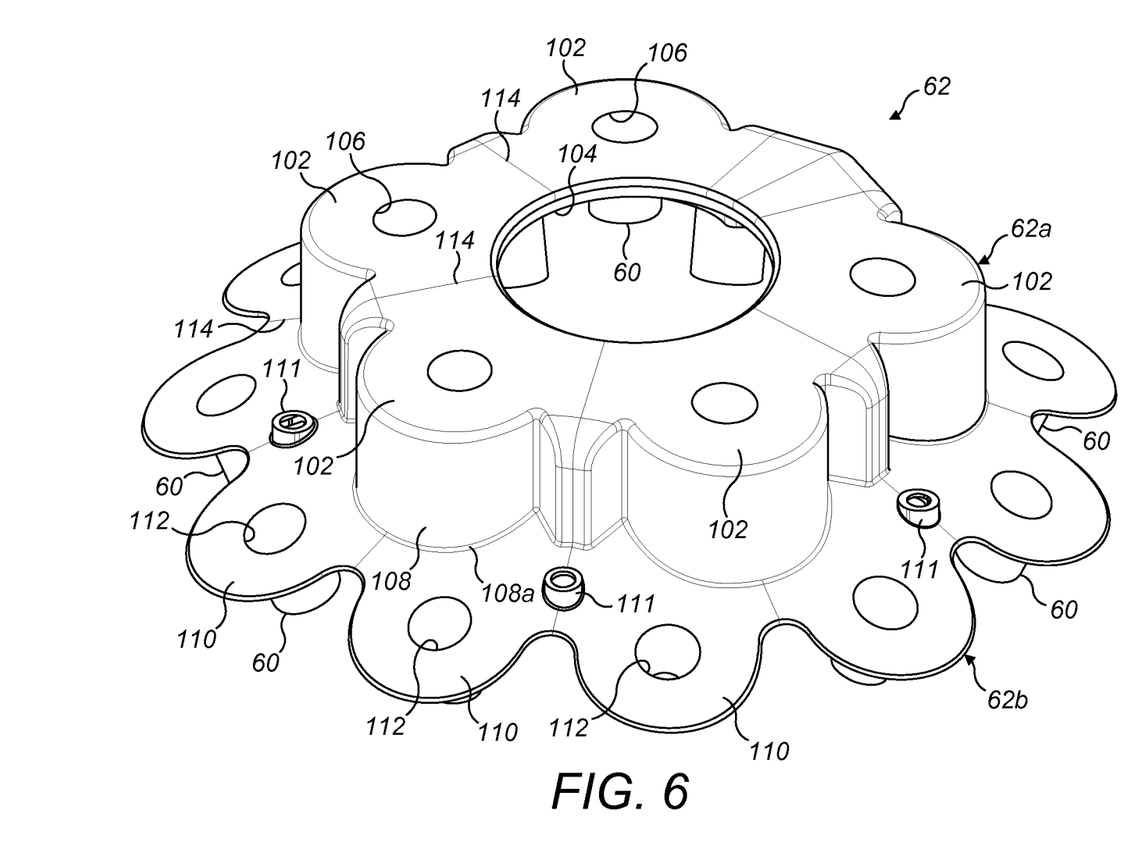
FIG. 6 is a perspective view of an embodiment of a vortex finder member of the separating apparatus.

Reference will now be made also to FIG. 6 which shows the vortex finder member 62 in more detail. The vortex finder member 62 is generally plate-like in form and performs two main functions. Its primary function is to provide a means by which air is channeled out of the cyclones 50 on an upwardly spinning column of air and thereafter to direct the airflow exiting the cyclones 50 to an appropriate zone on the adjacent exhaust manifold 82. Secondly, it serves to seal to upper end of the cyclones 50 so that air cannot bleed away from the primary airflow inside the cyclones.

In more detail, the vortex finder plate 62 of the invention comprises upper and lower vortex finder portions 62a, 62b, each of the portions providing vortex finders 60 for respective cyclones in the first and second sets of cyclones 70, 72. The first, upper, vortex finder portion 62a includes five planar segments 102 configured into a ring so as to define a central aperture 104 matching the central aperture 84 of the exhaust manifold 82. Each of the upper segments 102 defines a central opening 106 (only two of which are labelled for clarity) from which the cylindrical vortex finders 60 depend. As can be seen clearly in FIG. 3, the vortex finders 60 associated with the second set of cyclones 72 sit within the outlet end of the cyclones and are coaxial to the cyclone axis $C_2$. Accordingly, the segments 102 in the first ring are dished downwards slightly out of a horizontal plane. The outer edge of the segments 102 define a downwardly depending wall or skirt 108, the lower end 108a of which defines the inner edge of the lower vortex finder portion 62b.

The lower vortex finder portion 62b comprises ten segments 110 in total (only three of which are labelled for clarity), corresponding to the number of cyclones in the first set of cyclones 70. Once again, each segment 110 includes a central opening 112 from which depends a respective one of the vortex finders 60. With reference to FIG. 3, it should be noted that the vortex finders 60 of the lower vortex finder portion 62b sit coaxially within the upper end of each respective cyclone in the first set 70 so as to be centered on the cyclone axis $C_1$. Therefore, each segment 110 is angled downwardly with respect to the first ring so that the plane of the segment 110 is perpendicular to the axis $C_1$.

It will be appreciated from the above that each of the vortex finders for the stacked sets of cyclones is provided by a common vortex finder plate. Such an arrangement improves the sealing of the cyclone outlets since a single vortex finder plate can be assembled on both upper and lower sets of cyclones which reduces the possibility of air leaks which may occur if the vortex finders for each set of cyclones were provided by an individual vortex finder plate.

In order to secure the vortex finder plate 62 to the second cyclonic separating unit 22, lugs 111 are provided on the lower vortex finder portion 62b. Screw fasteners may then pass through the lugs 111 to engage with corresponding bosses 113 (shown in FIG. 5) provided on the lower set of cyclones 72. On assembly, suitable rubber gasket rings 115a, 115b are positioned so as to be sandwiched between the upper face of the second cyclone separating unit 22 and the underside of the vortex finder plate 62. Although various materials may be used for the gasket rings, for example natural fibre-based material, a flexible polymeric material is preferred. It will be noted that since the vortex finder plate 62 fastens directly to the lower set of cyclones 72, that the gaskets 115a, b and the second set of cyclones 70 are clamped between them. As a result the gaskets and the vortex finder plate are secured without needing additional fasteners, which reduces the part count of the separating apparatus as a whole as well as reducing weight and manufacturing complexity.

In this embodiment, each vortex finder segment in both the lower and upper portions 62a, 62b is demarcated from its neighbouring segment by a line of weakness to allow a degree of relative movement between them. The lines of weakness allow the segments 102, 110 an element of 'play' so that they may find a natural position on top of the cyclones when separator is assembled. However, it should be noted that these lines of weakness are not essential to the invention and the vortex finder member could instead be made rigid with limited or no flexibility between the segments. A suitable material for the vortex finder member is any suitably rigid plastics, for example acrylonitrile butadiene styene (ABS).

The skilled will appreciated that various modifications may be made to the inventive concept without departing from the scope of the invention, as defined by the claims.

For example, although the vortex finder plate has been described here as being defined by a plurality of interconnected, and integral, segments, optionally demarcated by lines of weakness, the vortex finder plate could also be formed from continuous ring elements with no differentiating features.

With reference to the filter member 86, it should be noted that in the specific embodiment described above the filter member 86 is provided with a plurality of apertures 100 distributed around its circumference to provide a radial airflow path for air to enter the interior of the filter, the apertures 100 being aligned with a respective one of the radially distributed vortex fingers 80 of the manifold 82. However, it should be appreciated that the alignment is not essential, and the number of apertures in the filter 86 need not coincide with the number of the vortex fingers 80. One possibility, for example, is that a single aperture could extend circumferentially about the inlet portion of the filter. It should be noted for example that airflow benefits may be attained by reducing the number of apertures, whilst increasing the aperture area. The important feature is that air is able to flow radially inward into the filter member to access the interior of the filter and then to flow axially inside the tubular structure defined by the filter media before passing through the wall of the filter media. This avoids the need for a chamber to be provided above the filter.

Furthermore, although the filter portion 86b has been described as cylindrical, it may also be conical or frusto-conical such that the filter portion 86b tapers towards its lower end 86c which has a smaller diameter compared to its upper, or inlet, end. A tapered filter portion 86b may be beneficial in resisting deformation due to the comparatively reduced pressure region in the outlet duct 94 which may tend to impart a 'curved' shape to the filer portion 86b in use.

Figure 7:
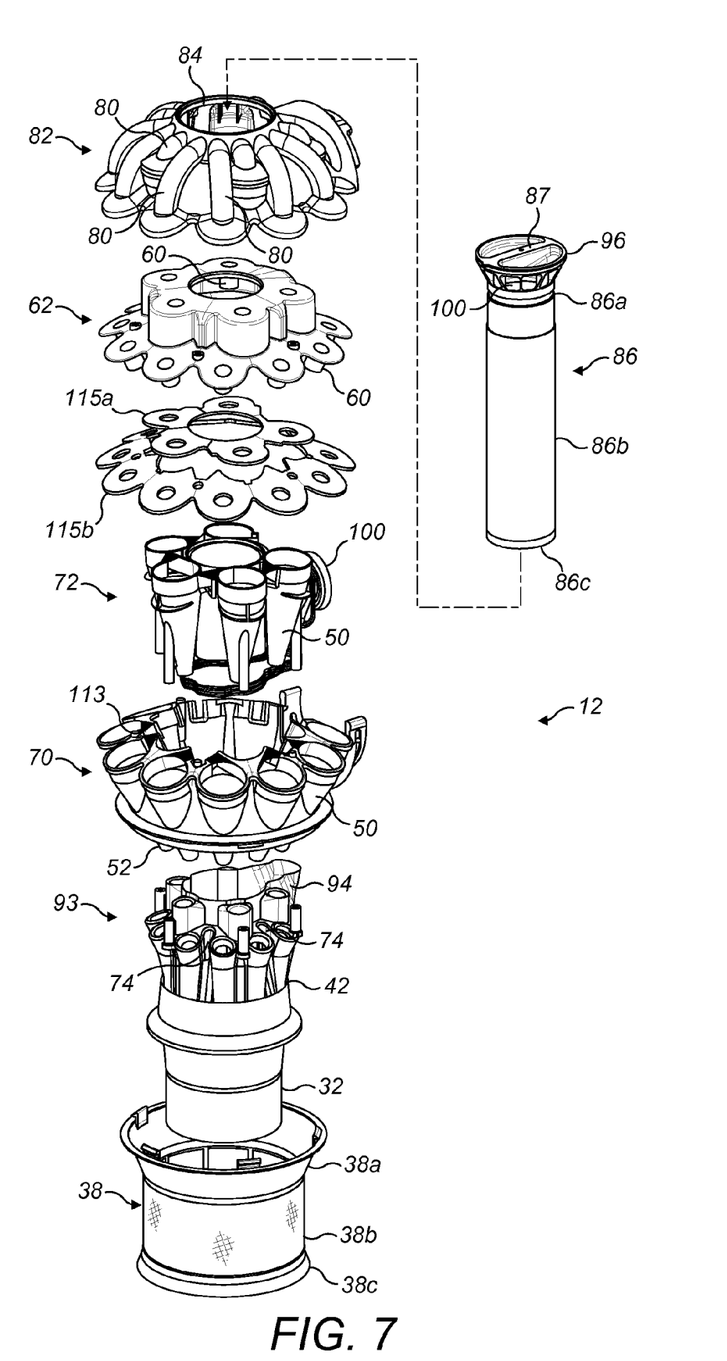
FIG. 7 is an exploded perspective view of the separating apparatus like that of FIG. 4 but showing a modified configuration of secondary cyclones.
Figure 8A:
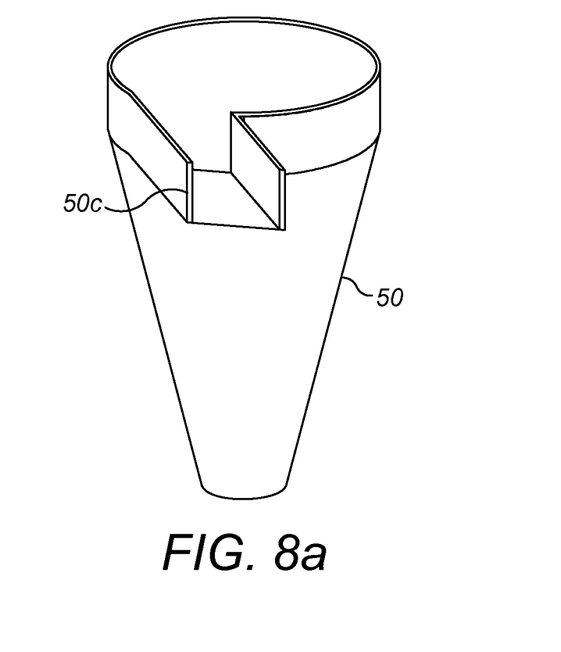
FIG. 8a and FIG. 8b are simplified enlarged views of secondary cyclones comparing those of the embodiment of FIG. 4 and the embodiment of FIG. 7.

A further variant to the cyclonic separating apparatus described above is shown in FIG. 7 in which parts corresponding to the previous embodiments will be referred to using the same reference numerals. Furthermore, only the differences will be described. FIG. 7 is equivalent to FIG. 4 but the skilled person will appreciate that the air inlets 150c of the plurality of cyclones 150 in the secondary cyclonic separating unit 22 have been modified compared to the air inlets 50c of the cyclones 50 in FIG. 4. So as to show the differences between the cyclones in FIG. 4 and FIG. 7 more clearly, reference will also be made to FIGS. 8a and 8b. FIG. 8a illustrates, in simplified form, the configuration of the cyclones 50 in the embodiment in FIG. 4 whereas FIG. 8b illustrates, in simplified form, the configuration of the cyclones 150 in the embodiment in FIG. 7.

Referring firstly to FIG. 8a, the air inlet 50c of the cyclone 50 is shaped like an open channel or trough having a base portion and opposed side walls. It is therefore U-shaped in cross section. The open part of the air inlet 50c is closed when the cyclonic separating apparatus is assembled such that the gasket 115a and 115b are clamped onto the enlarged ends of the cyclones 50.

Figure 8B:
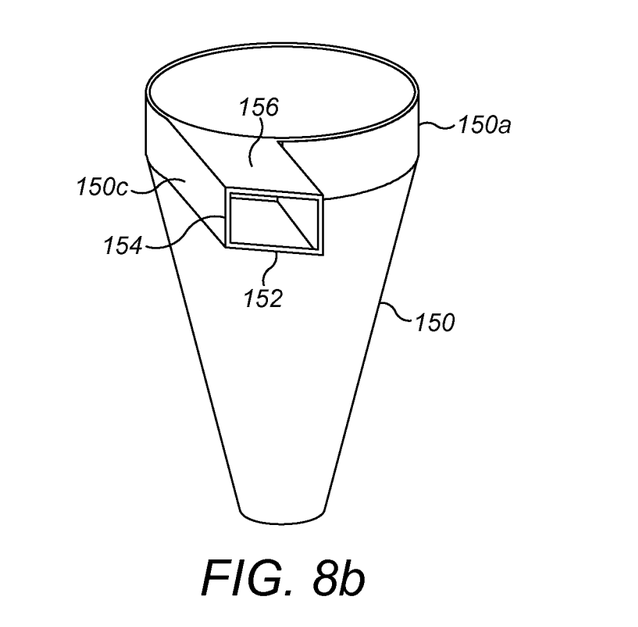

Referring now to FIG. 8b, the cyclone 150 includes an upper enlarged cylindrical portion 150a into which the air inlet 150c is incorporated. In contrast to the air inlet 50c in FIG. 8a, the air inlet 150c of the modified secondary cyclones 50 is a fully enclosed channel or duct. Here, the inlet 150c has a rectilinear cross section including a base 152, opposed side walls 154, and a lid or closure part 156 which, in this embodiment, is integral with the walls 154. It should be appreciated that during assembly of the cyclonic separating apparatus, the gaskets 115a and 115b are clamped down onto the tops of the secondary cyclones 150 and portions of the gaskets 115a, 115b bear down onto the closure part 156 of the air inlet 150c. This configuration of air inlet has been determined to improve airflow through the air inlet 150c into the cyclone 150 and to improve consistency of airflow between the inlets 150c of the cyclones 150 both effects assisting the tuning of the cyclones for optimum performance and pressure recovery. This is because the closure part 156 prevents the malleable material of the gaskets 115a, 115b from deforming under the clamping load during assembly which can cause the gasket material to be pushed into the interior of the air inlet 50c. It should of course be noted that the air inlets 50c, 150c need not be rectilinear in cross section and may take other forms, circular for example.

The invention claimed is:

1. A cyclonic separating apparatus comprising a first cyclonic separating unit and, downstream from the first cyclonic separating unit, a second cyclonic separating unit comprising a plurality of cyclones arranged fluidly in parallel about a first axis and a dust collector arranged to receive dust from each of the plurality of cyclones, each of the plurality of cyclones in the second cyclonic separation unit comprising a fluid inlet and a fluid outlet, the plurality of cyclones being divided into at least a first set of cyclones and a second set of cyclones, the fluid inlets of the first set of cyclones being arranged in a first group and the fluid inlets of the second set of cyclones being arranged in a second group that is spaced along the first axis from the first group such that the fluid inlets of the second group are non-overlapping with the fluid inlets of the first group in a direction that is parallel to the first axis, wherein each outlet of the plurality of cyclones in the second cyclonic separation unit is provided by a common vortex finder plate that comprises a first portion that includes vortex finders for the first set of cyclones and a second portion that includes vortex finders for the second set of cyclones, and wherein the second portion is spaced apart from the first portion in the direction that is parallel to the first axis.

2. The cyclonic separating apparatus of claim 1, wherein the second set of cyclones is at least partially received inside the first set of cyclones.

3. The cyclonic separating apparatus of claim 1, wherein the first set of cyclones comprises a greater number of cyclones than the second set of cyclones and wherein the cyclones of the second set of cyclones are angularly spaced so as to be positioned between a respective pair of cyclones in the first set of cyclones.

4. The cyclonic separating apparatus of claim 1, wherein the first and second portions are annular portions that are arranged concentrically and connected by a wall of the vortex finder plate.

5. The cyclonic separating apparatus of claim 4, wherein each of the first and second annular portions includes a plurality of segments each of which defines a single vortex finder.

6. The cyclonic separating apparatus of claim 4, wherein a first end of the wall defines an outer edge of the first portion and a second end of the wall defines an inner edge of the second portion.

7. The cyclonic separating apparatus of claim 1, wherein an exhaust manifold is located above the vortex finder plate such that the vortex finder plate is sandwiched between the plurality of cyclones and the exhaust manifold.

8. The cyclonic separating apparatus of claim 7, wherein the exhaust manifold channels the air from the vortex finders into an air duct located along the first axis of the separating apparatus about which the plurality of cyclones are arranged, the air duct receiving a filter plate.

9. The cyclonic separating apparatus of claim 8, wherein the filter plate is engageable with a centrally located aperture in the outer surface of the exhaust manifold.

10. The cyclonic separating apparatus of claim 9, wherein the filter plate comprises a generally tubular filter media portion adjacent a mounting portion which is engageable with the exhaust manifold.

11. The cyclonic separating apparatus of claim 10, wherein the mounting portion defines a fluid inlet of the filter plate into which fluid is admitted radially into an inner elongate chamber of the filter plate.

12. The cyclonic separating apparatus of claim 11, wherein the fluid inlet is defined around the circumference of the mounting portion.

* * * * *